(12) United States Patent
Malone (10) Patent No.: US 9,679,124 B2
(45) Date of Patent: Jun. 13, 2017

(54) SMART CAPTCHAS (71) Applicant: Disney Enterprises, Inc., Burbank, CA (US)

(72) Inventor: James A. Malone, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/477,998

(22) Filed: Sep. 5, 2014

(65) Prior Publication Data

US 2016/0070902 A1 Mar. 10, 2016

(51) Int. Cl.
| | | |
|---|---|---|
| *H04L 29/06* | (2006.01) | |
| *H04L 9/32* | (2006.01) | |
| *G06F 17/30* | (2006.01) | |
| *G06F 21/00* | (2013.01) | |
| *G06F 15/16* | (2006.01) | |
| *G06F 21/31* | (2013.01) | |
| *G06F 21/36* | (2013.01) | |

(52) U.S. Cl.
CPC ............ *G06F 21/316* (2013.01); *G06F 21/36* (2013.01); *G06F 2221/2133* (2013.01); *H04L 9/3271* (2013.01)

(58) Field of Classification Search
CPC .. G06F 21/36; G06F 2221/2133; G06F 21/31; G06F 21/316; G06F 2221/2103; H04L 9/3271
USPC ...... 726/2–5, 7; 709/203, 206; 713/168, 182
See application file for complete search history.

(56) References Cited

U.S. PATENT DOCUMENTS

| | | | | |
|---|---|---|---|---|
| 2004/0254827 A1* | 12/2004 | Hind | ...................... | G06Q 30/02 709/201 |
| 2006/0271690 A1* | 11/2006 | Banga | .................... | H04L 67/306 709/228 |
| 2008/0133348 A1* | 6/2008 | Reed | ....................... | G06Q 30/02 705/14.49 |
| 2011/0314537 A1* | 12/2011 | Hulten | .................... | G06F 21/31 726/17 |
| 2012/0246737 A1* | 9/2012 | Paxton | .................. | G06F 21/316 726/27 |

* cited by examiner

*Primary Examiner* — Alexander Lagor
(74) *Attorney, Agent, or Firm* — Patterson + Sheridan, LLP (57) ABSTRACT

Systems, methods and articles of manufacture providing analytically enhanced user interfaces and smart CAPTCHAs. The analytically enhanced user interfaces may collect information regarding a user's interaction with the user interface, and asynchronously transmit the collected information to a logging service. The smart CAPTCHAs may gather information regarding a user based on the input the user provides to the smart CAPTCHA.

18 Claims, 7 Drawing Sheets

SMART CAPTCHAS

BACKGROUND

Field of the Disclosure

Embodiments disclosed herein relate to the field of computer software. More specifically, embodiments disclosed herein relate to analytically enhanced forms and smart CAPTCHAs.

Description of the Related Art

Computerized forms and other user interfaces have been used to collect data from users. A computerized form includes a collection of elements which the user completes and submits. Traditionally, the only information obtained from such forms has been limited to the information explicitly entered by a user completing the form, such as name, address, email, and the like. Furthermore, the user must actually submit the form in order to obtain the data explicitly entered by the user.

Completely automated public Turing tests to tell computers and humans apart (CAPTCHAs) have traditionally been used to verify that someone filling out a form is a real person (and not a computer program).

SUMMARY

Embodiments disclosed herein include systems, methods, and computer program products to perform an operation comprising monitoring user interaction with a first element of a user interface displayed on a display device, wherein the user interface includes a plurality of elements, collecting attributes of the user interaction with the first element of the user interface, and asynchronously transmitting, via a network to a server, the attributes of the user interaction separately from a submission of the user interface.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide analytically enhanced forms (also referred to as "smart forms") that monitor a user's interaction with forms in order to collect different data points about the user and the interaction with the forms. Generally, how a user interacts with a form may generate data points that may be used to group, classify, and understand users beyond what details they explicitly enter into the form. Embodiments disclosed herein leverage how a user interacts with a form to provide insight into the user independent of whether the user completes or submits the form. Furthermore, embodiments disclosed herein may leverage how the user interacts with the form to determine or estimate demographic details or personal preferences about the user.

The analytically enhanced form described herein includes logic configured to monitor the user's interaction with the form and create data points based on the monitoring. The logic may then asynchronously transmit collected data points to a remote logging service in order to capture data in real time. The data points may be based on any aspect of the user's interaction with the form, attributes of the form, user actions, or any combination thereof.

Stated differently, an analytically enhanced form captures data about when, where, and how a user fills out a form. Generally, an analytically enhanced form may capture, without limitation, data regarding which element a user is editing (or interacting with), how long the editing has taken place (per element and/or per form), how many edits the user has made to each element in the form (and a total number of edits across the form), how the user accesses the form element (such as through a mouse click, tab, or touching a touchscreen), and how the user enters data into the form fields (such as by keypresses of a physical keyboard, autocomplete, a mouse, or a virtual keyboard). For example, and without limitation, the captured data points may indicate that the user took 30 seconds to fill out a three question form, spending 20 seconds on the first question and 5 seconds on each of the second and third questions, tabbing between text boxes to answer the questions, and typing via a physical keyboard.

Although web forms are used as a reference example herein, such examples should not be considered limiting of the disclosure, as the disclosure may be applied equally to all other types of user interfaces.

Embodiments disclosed herein also provide smart CAPTCHAs, which are CAPTCHAs that perform a secondary function of determining demographic or preference detail from a user. For example, based on an IP address, device, cookie, or any other attribute, embodiments disclosed herein may suspect that a user is female. The smart CAPTCHA may increase the confidence that the user is a female by presenting the user with several words having obvious gender differences and prompting the user to enter a subset of the words. Based on the words entered by the user, embodiments disclosed herein may be strengthen or weaken the confidence in the user being female. As another example, users may be presented with options linked to different preferences, which, if selected, reflect a user's preference for the selection.

Figure 1:
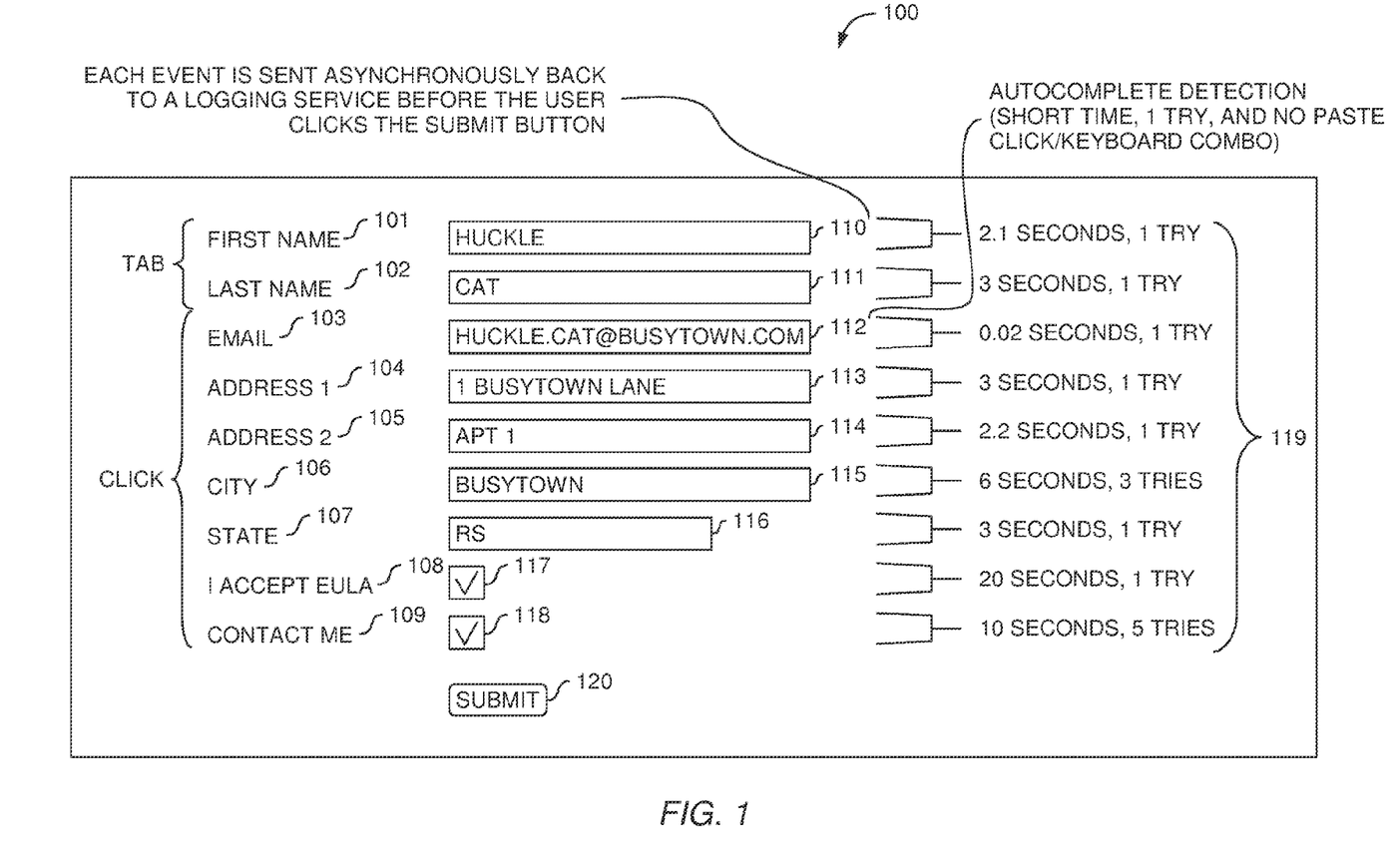
FIG. 1 is a schematic illustrating an analytically enhanced form, according to one embodiment.

FIG. 1 is a schematic illustrating an analytically enhanced form 100, according to one embodiment. The analytically enhanced form 100 may be a web-based form that a user may access via a web browser (not pictured). As shown, the analytically enhanced form 100 includes a plurality of form elements 101-109, namely first name 101, last name 102, email address 103, addresses 104-105, city 106, state 107, a EULA acceptance 108, and consent to be contacted 109. Each form element 101-109 has a corresponding input element 110-118 where the user provides input. Therefore, as shown, a user has entered a value of "Busytown" in the input element 115 for the city 106 portion of their address. When the user provides input for each input element 110-118, the user may submit the form using the submit button 120.

The analytically enhanced form 100 includes logic (not pictured) configured to monitor a user's interaction with the form, and collect different data points regarding the interaction. As shown, a plurality of data points 119 have been collected by monitoring the user's interaction with the analytically enhanced form 100. For example, as shown, the user spent 2.1 seconds entering a first name in a single try, 6 seconds and 3 tries to enter a city, and 10 seconds and 5 tries to accept the form's offer to be contacted. In addition, as shown, the user entered an email address 103 in 0.02 seconds and 2 tries, indicating the user may have entered the email address 103 using an autocomplete feature of a web browser. Determining that autocomplete was used may be based on one or more of the time required to enter the value being lower than a threshold, a number of tries being lower than a threshold number of tries, that no paste function used (such as via a mouse or keyboard combination), that a count of the number of keystrokes compared to a count of the number of characters in the element is not within a threshold, and the like.

In addition, the analytically enhanced form 100 includes logic to determine how the user accesses the different elements of the form. As shown, the logic determines that the user tabbed between the input field 110 for the first name 101 and the input field 111 for the last name 102. Thereafter, the logic determines that the user used a mouse (or other pointing device, or a touchscreen display) to click on the remaining elements. Each data point 119, once gathered, may be asynchronously transmitted to a logging service independent of the user's submission of the form 100, allowing an entity associated with the form to know additional data about the user prior to the user's completion and submission of the form. Similarly, other gathered events, attributes, and information (including, without limitation, the tab/click access methods, total time to complete the form, and the like) may be asynchronously transmitted to the logging service for storage. Therefore, the analytically enhanced form 100 provides techniques to capture data above and beyond what is explicitly entered by the user in input elements 110-118, such as how the user moved between the input elements 110-118, the number of tries the user needed to complete each input element 110-118, an amount of time the user took to complete each input element 110-118, a total time to complete the form 100, and whether the user used autocomplete. Furthermore, instead of asynchronously transmitting the data points 119, in at least one embodiment, the automatically enhanced form 100 may "bundle" the data points 119 together and send the collected data to the logging service along with the user's final form submission.

Based on the data collected by the analytically enhanced form 100, a number of assumptions may be made about the user and the data entered by the user. For example, the user may be categorized into any number of demographics, such as male, female, young adult, middle aged, sports fan, movie buff, and the like. Furthermore, if the user enters data too quickly, or makes multiple revisions, embodiments disclosed herein may determine that the data is not reliable or truthful. A level of reliability or veracity of the data explicitly provided by the user may therefore be stored for future use and/or modification. In addition, embodiments disclosed herein may use the data collected by the analytically enhanced form 100 to update how a form is rendered in real-time. If the data indicates that the user took a long time to complete the form, the form may be revised to be more appealing or engaging to users, as the lengthy time may be attributed to the user being bored or disinterested by the form. Data specific to devices and software may also be collected by the analytically enhanced form 100, allowing providers to determine whether problems with the automatically enhanced form 100 are specific to one or more types of browsers, platforms, devices, and the like. Still further, the data collected by the analytically enhanced form 100 may help identify automated and/or fraudulent form entry without relying on traditional mechanisms such as email verification, CAPTCHAs, and the like.

Figure 2A:
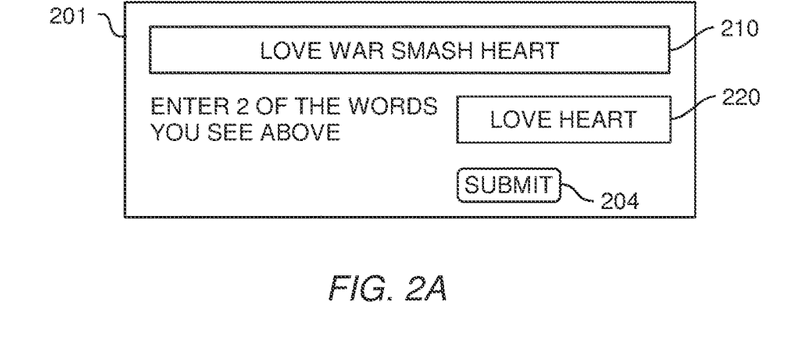
FIGS. 2A-2C illustrate a graphical user interface including a smart CAPTCHA, according to one embodiment.

FIG. 2A illustrates a graphical user interface (GUI) 201 including a smart CAPTCHA, according to one embodiment. Generally, the GUI 201 includes the components of a CAPTCHA, namely an options box 210, an input box 220, and a submit button 204. The options box 210 includes a set of items that are displayed to the user. The user must then enter a subset (in this example, two), of the items in the input box 220, in order to validate their identity as a person (therefore satisfying the primary use of a CAPTCHA).

As shown, the options box 210 includes four words, namely "love," "war," "smash," and "heart." Each of the words may be associated with a user attribute, such as gender. For example, "love" and "heart" may be associated (or correlated) with females, while "war" and "smash" may be associated with males. If an entity presenting the GUI 201 seeks to confirm a user's gender (or boost confidence in an assumption as to the user's gender), embodiments disclosed herein analyze the input provided by the user in the input box 220. The assumption may be based on a piece of evidence (such as an IP address, device, operating system, etc) indicating the user may be a male (or female). As shown, the user has typed "love" and "heart" in the input box 220. Once submitted, embodiments disclosed herein may reference predefined associations between the words inputted by the user. Based on these associations, embodiments disclosed herein may strengthen an assumption that the user is a female, or weaken an assumption that a user is male.

As another example, a smart CAPTCHA may be used to identify different users on a shared system. For example, two users may access a smart CAPTCHA using the same web browser. In such a case, the smart CAPTCHA may be used to identify which user is currently using the web browser. For example, the options box 210 may be drawn to include five colors, from which the user must select two. Furthermore, user profile data stored on a server may indicate each user's favorite colors. For example, user X may list blue and white as his favorite colors, while user Z may list red and green as his favorite colors. Therefore, the options box 210 may specify red, white, blue, green, and yellow as possible choices. If the user inputs "blue" and "white" into the input box 220, embodiments disclosed herein may determine that user X is currently using the browser.

Figure 2B:
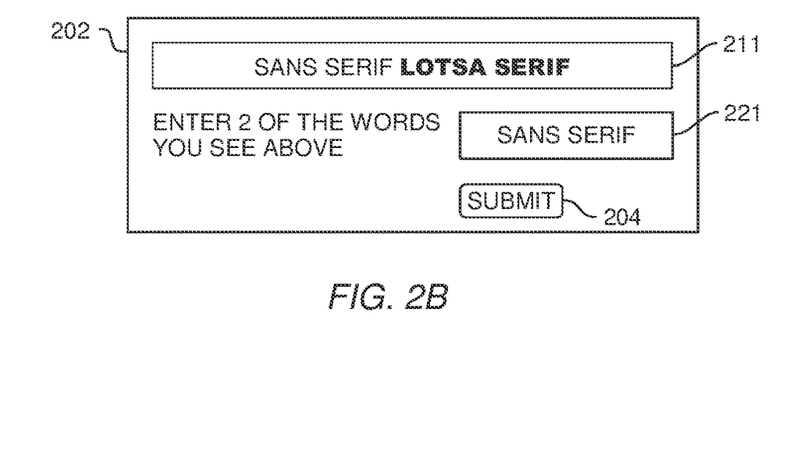

FIG. 2B illustrates a graphical user interface (GUI) 202 including a smart CAPTCHA, according to another embodiment. Generally, FIG. 2B illustrates an embodiment where a smart CAPTCHA is used to capture a user preference. As shown, the option box 211 includes two sets of words, "sans serif," and "lotsa serif," with each option displayed in the respective font (sans serif and lotsa serif). As shown, the user has entered "sans serif" in the input box 221. When the user clicks the submit button 204, a server may receive the user selection of sans serif, and store an indication that sans serif is the user's preferred font. Thereafter, the server may create web pages for the user that use the sans serif font for all text. Similarly, this principle can be extended to any other user preference, such as preferred colors, backgrounds, themes, and the like.

Figure 2C:
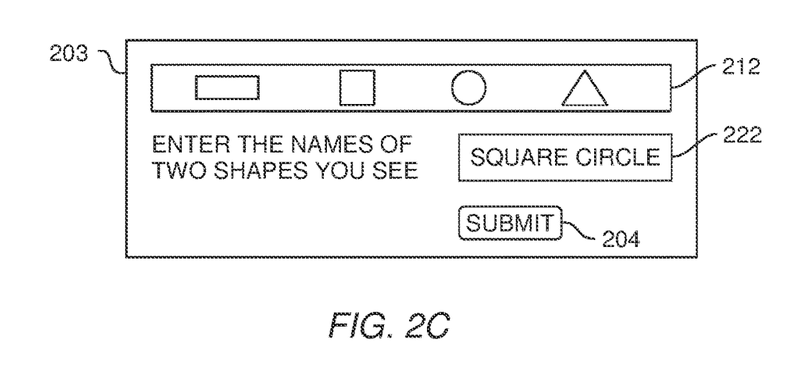

FIG. 2C illustrates a graphical user interface (GUI) 203 including a smart CAPTCHA, according to another embodiment. Generally, the CAPTCHA depicted in FIG. 2C is used to create a psychological profile. As shown, an options box 212 includes four shapes, namely a rectangle, square, circle, and triangle. Each of the shapes may be associated with a different attribute, trait, or other personality characteristic. For example, the rectangle may be associated with happiness, the square may be associated with boredom, the circle may be associated with wealth, and the triangle may be associated with education. Furthermore, combinations of different options may be associated with an attribute, such as the circle and square being associated with high levels of achievement. As shown, the user has entered "square" and "circle" in the input box 222. Based on this input, embodiments disclosed herein may reference predefined associations of "square," "circle," and/or "circle and square." Based on these predefined associations, a user profile of the user may be updated to include the attributes defined in the associations. Continuing with the above example, therefore, the user profile may be updated to indicate that the user is bored, wealthy, and has attained high levels of achievement. This information may be used in any way, such as to serve targeted ads, content, and the like.

Over time, embodiments disclosed herein may also refine the associations between different items displayed to users as part of the smart CAPTCHA. For example, if men are determined to choose "heart" just as frequently as women in FIG. 2A, then the association between "heart" and women may be made less strong. Similarly, the association between "heart" and men may be strengthened. Furthermore, a composite association may be created linking women and men to "heart."

Figure 3:
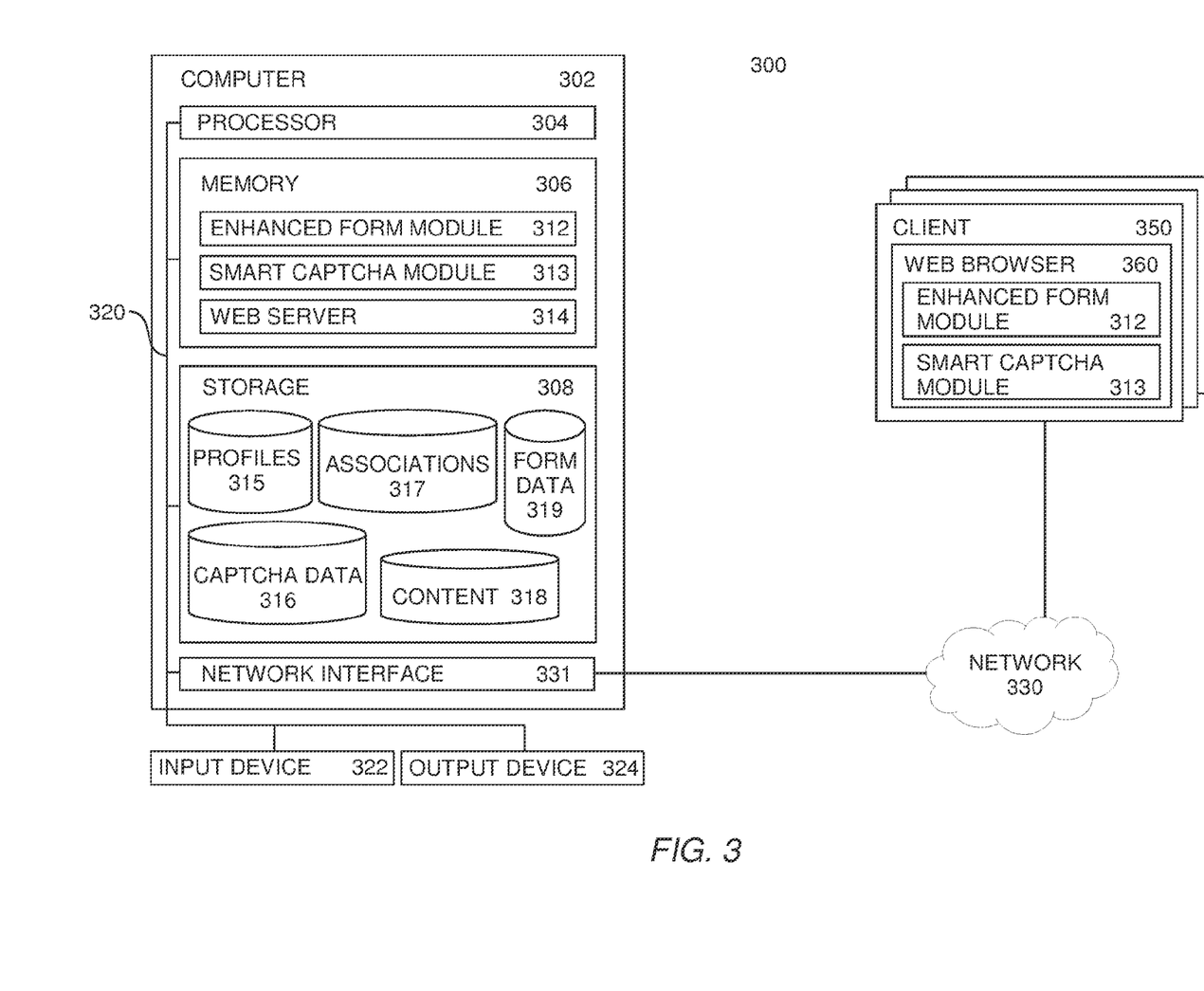
FIG. 3 illustrates a system to provide analytically enhanced forms and smart CAPTCHAs, according to one embodiment.

FIG. 3 illustrates a system 300 to provide analytically enhanced forms and smart CAPTCHAs, according to one embodiment. The networked system 300 includes a computer 302. The computer 302 may also be connected to other computers via a network 330. In general, the network 330 may be a telecommunications network and/or a wide area network (WAN). In a particular embodiment, the network 330 is the Internet.

The computer 302 generally includes a processor 304 connected via a bus 320 to a memory 306, a network interface device 331, a storage 308, an input device 322, and an output device 324. The computer 302 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 304 is included to be representative of a single CPU, multiple CPUs, a single CPU having multiple processing cores, and the like. The network interface device 331 may be any type of network communications device allowing the computer 302 to communicate with other computers via the network 330.

The storage 308 may be a persistent storage device. Although the storage 308 is shown as a single unit, the storage 308 may be a combination of fixed and/or removable storage devices, such as fixed disc drives, solid state drives, SAN storage, NAS storage, removable memory cards or optical storage. The memory 306 and the storage 308 may be part of one virtual address space spanning multiple primary and secondary storage devices.

The input device 322 may be any device for providing input to the computer 302. For example, a keyboard and/or a mouse may be used. The output device 324 may be any device for providing output to a user of the computer 302. For example, the output device 324 may be any conventional display screen or set of speakers. Although shown separately from the input device 322, the output device 324 and input device 322 may be combined. For example, a display screen with an integrated touchscreen may be used.

As shown, the memory 306 contains an enhanced form module 312, a smart CAPTCHA module 313, and a web server 314. The enhanced form module 312 is an application generally configured to provide analytically enhanced user interfaces, such as the form 100, that monitor a user's interaction with the form and its constituent elements, generates data points based on the monitoring, and asynchronously transmits the collected data from the user's device (such as the client 350) to a central location (such as the computer 302) for storage and processing. In addition to the elements of the form, the enhanced form module 312 may transmit attributes of the device, such as a device type, operating system, input sources, and the like. For example, the enhanced form module 312 may monitor and transmit contextual information received from different sources of input to the device (such as beacons, Bluetooth devices, near field communication (NFC) devices, or other wearable devices), which may or may not be generated by user interaction with such input sources. Furthermore, the enhanced form module 312 may monitor a user's interaction with a smart CAPTCHA provided by the smart CAPTCHA module 313.

Generally, the enhanced form module 312 may monitor any aspect of the user's interaction with a form, including, without limitation, which element a user is editing, how long the editing has taken place (per element and/or per form), how many edits the user has made to each element in the form, how the user accesses the element, and how the user enters data into the form input elements. Although the enhanced form module 312 may be written in any programming language, in at least one embodiment, the enhanced form module 312 is implemented as JavaScript in a webpage. Similarly, the enhanced form module 312 may be implemented as a browser extension, plugin, or library.

The smart CAPTCHA module 313 is an application generally configured to provide smart CAPTCHAs that verifies that a user is a person, and leverages the options presented to the user as part of the CAPTCHA in order to gain additional information about the user. For example, the smart CAPTCHA may be used to strengthen an assumption made about the user, to receive preference information from the user, to receive demographic information about the user, or to generally profile the user.

In some embodiments, the enhanced form module 312 and/or the smart CAPTCHA module 313 may perform their respective functionalities on a single device. For example, the enhanced form module 312 on the client device 350 may not need to transmit the collected interaction data to a remote server for further processing. Similarly, the smart CAPTCHA module 313 executing on the client device 350 may locally process user data received through the smart CAPTCHA to gain additional information about the user without having to submit the user selected options to the computer 302. Instead, the enhanced form module 312 or the smart CAPTCHA module 313 executing on the client device 350 may have access to a local storage (not pictured) that includes the profiles 315, CAPTCHA data 316, associations store 317, content store 318, and form data 319. Therefore, the complete functionality of the smart CAPTCHA module 313 and/or the enhanced form module 312 described herein may be performed on a single device.

The web server 314 is an application generally configured to store, process and deliver web pages to clients 350, which may display the web pages using a web browser 360. The web pages generated by the web server 314 may include analytically enhanced forms by including the enhanced form module 312. The web pages generated by the web server 314 may include a smart CAPTCHA provided by the smart CAPTCHA module 313. In some embodiments, the web pages may include both a smart CAPTCHA and an analytically enhanced form. For example, the enhanced form module 312 may monitor the user's interaction with a smart CAPTCHA 313 displayed on the web browser 360. The enhanced form module 312, executing on the client system 350, may monitor user interactions with an analytically enhanced form, gather data regarding the interactions, and transmit the data to the instance of the enhanced form module 312 executing on the computer 302.

As shown, the storage 308 includes the profiles 315, a CAPTCHA data 316, an associations store 317, a content store 318, and a form data 319. The profiles 315 is generally configured to store user profile data. The user profile data may include any number and type of attributes of a user, such as demographic information, preferences, and personality data. Furthermore, the user profiles in the profile 315 may include an indication as to a level of truth or reliability in the data explicitly provided by the user when completing forms. The CAPTCHA data 316 is generally configured to store data that is displayed to a user as part of a smart CAPTCHA. The CAPTCHA data 316 may include options that are displayed to a user, from which the user must select a subset of options. The CAPTCHA data 316 may also include associations between the options displayed to the user and one or more user attributes, demographics, characteristics, and/or preferences. The associations store 317 is generally configured to store associations (or correlations) used by the enhanced form module 312 and the smart CAPTCHA module 313. For example, the associations 317 may include associations or correlations between CAPTCHA options and user attributes, demographics, characteristics, and/or preferences. The associations 317 may also include rules used by the enhanced form module 312 to make decisions regarding the user interaction data captured by monitoring the user's interaction with the form. For example, and without limitation, the associations 317 may store threshold times for determining whether a user used autocomplete to fill out a form field, threshold numbers of edits for different levels of confidence in the user data, threshold amounts of time used to determine how engaged the user is with the form, and the like. For example, a rule may specify that a user should take less than 3 seconds to complete form element A, while another rule may specify that a user should take less than 20 seconds to complete form element B, as the user may not know the information immediately and may need to search for it from other sources. In at least some embodiments, the enhanced form module 312 or the smart CAPTCHA module 313 may include timers that are started when the user interacts with an element (or when the form is loaded). The timers may be stopped when the user stops interacting with an element (or when the form is submitted by the user).

The content store 318 is generally configured to store web pages, forms, and any other content presented to a user via the client 350 and/or the web browser 360. The form data 319 is a configured to store input explicitly provided by users completing analytically enhanced forms. The form data 319 and/or the profiles 315 may store data gathered by the enhanced form module 312 when monitoring the user interacting with an analytically enhanced form on the client system 350.

Figure 4:
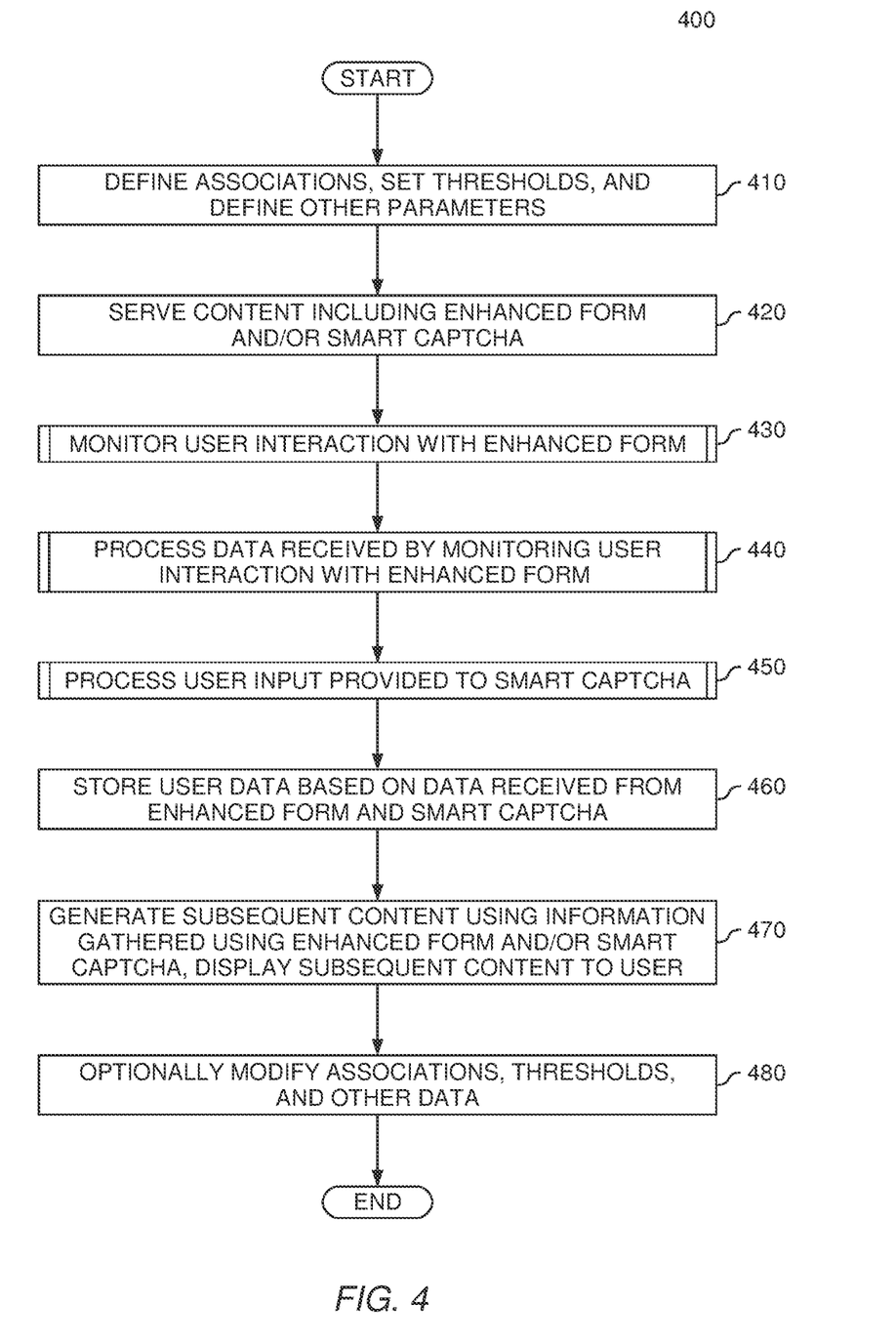
FIG. 4 is a flow chart illustrating a method to provide analytically enhanced forms and smart CAPTCHAs, according to one embodiment.

FIG. 4 is a flow chart illustrating a method 400 to provide analytically enhanced forms and smart CAPTCHAs, according to one embodiment. Generally, the steps of the method 400 provide analytically enhanced forms that monitor user interactions with the forms, collect data points regarding the interactions, and asynchronously transmit the collected data to a remote store. The steps of the method 400 also provide smart CAPTCHAs that collect subtle demographic or preference details about a user, based on the user selections made in responding to the smart CAPTCHA. Although FIG. 4 depicts an embodiment where both smart CAPTCHAs and analytically enhanced forms are presented to a user, in some embodiments, only one of the smart CAPTCHA and the analytically enhanced form may be presented to the user.

At step 410, a user (such as an administrator) may define associations, set thresholds, and define other parameters necessary for the smart CAPTCHA and/or the analytically enhanced forms, as previously described above. For example, the user may define associations between one or more items for display in a smart CAPTCHA and a demographic, attribute, and/or preference. The thresholds may be related to the user's interaction with an analytically enhanced form, as well as the decisions and/or assumptions that the enhanced form module 312 may make when gathering data regarding the user's interaction with an analytically enhanced form. At step 420, the web server 314 may serve content including an analytically enhanced form and/or a smart CAPTCHA. At step 430, described in greater detail with reference to FIG. 5, the enhanced form module 312 may monitor user interaction with an enhanced form. Generally, the enhanced form module 312 monitors all aspects of a user's interaction with a computerized user interface in order to gather and generate data points regarding the user's interaction with the form.

At step 440, described in greater detail with reference to FIG. 6, the enhanced form module 312 executing on the computer 302 may process the data received from the instance of the enhanced form module 312 on the client system 350 that monitored user interaction with the analytically enhanced form. For example, the enhanced form module 312 may determine that the input explicitly provided by the user is not very reliable because the user made a number of edits exceeding a reliability threshold. At step 450, described in greater detail with reference to FIG. 7, the smart CAPTCHA module 313 may process user input provided to a smart CAPTCHA. For example, the smart CAPTCHA module 313 may create an assumption about the user based on an existing piece of information about the user. The smart CAPTCHA module 313 may tailor the options presented to the user in order to strengthen or weaken the assumption of the user. For example, if the assumption is that, based on the user's device type, that the user is an avid gamer, the smart CAPTCHA module 313 may present at least one CAPTCHA option that has been defined to be associated with gamers in the associations 317. Additionally the smart CAPTCHA may be used to determine user preferences, assign the user into different demographics, assign different attributes to the user, and generally understand the user.

At step 460, the smart CAPTCHA module 313 and/or the enhanced form module 312 may store user data based on the data entered into the smart CAPTCHA and/or the analytically enhanced form by the user. At step 470, the web server 314 may generate subsequent content for the user based on the information intelligently gathered from the user based on the user's interaction with the analytically enhanced form and/or the smart CAPTCHA. For example, the color and fonts of web pages may be modified to match user preferences implicitly specified by the user's input to a smart CAPTCHA. As another example, if the enhanced form module 312 determines that a user is bored (based on total time to complete a first page of an enhanced form), the second page of the form may be modified to engage the user. For example, the second page may be shorter in length, may be rendered using more attractive fonts and graphics, or may have more interesting questions, and the like. At step 480, the enhanced form module 312 and/or the smart CAPTCHA module 313 may optionally modify associations, correlations, thresholds, and any other data in the associations 317. For example, if more than 90% of users take more than 10 seconds to answer a given question, and a boredom threshold is 2 seconds, the threshold may be increased to 12 seconds to reflect the fact that most users likely are not bored with the question, but may simply need more time to complete the question. Similarly, associations between smart CAPTCHA options may be modified over time.

Figure 5:
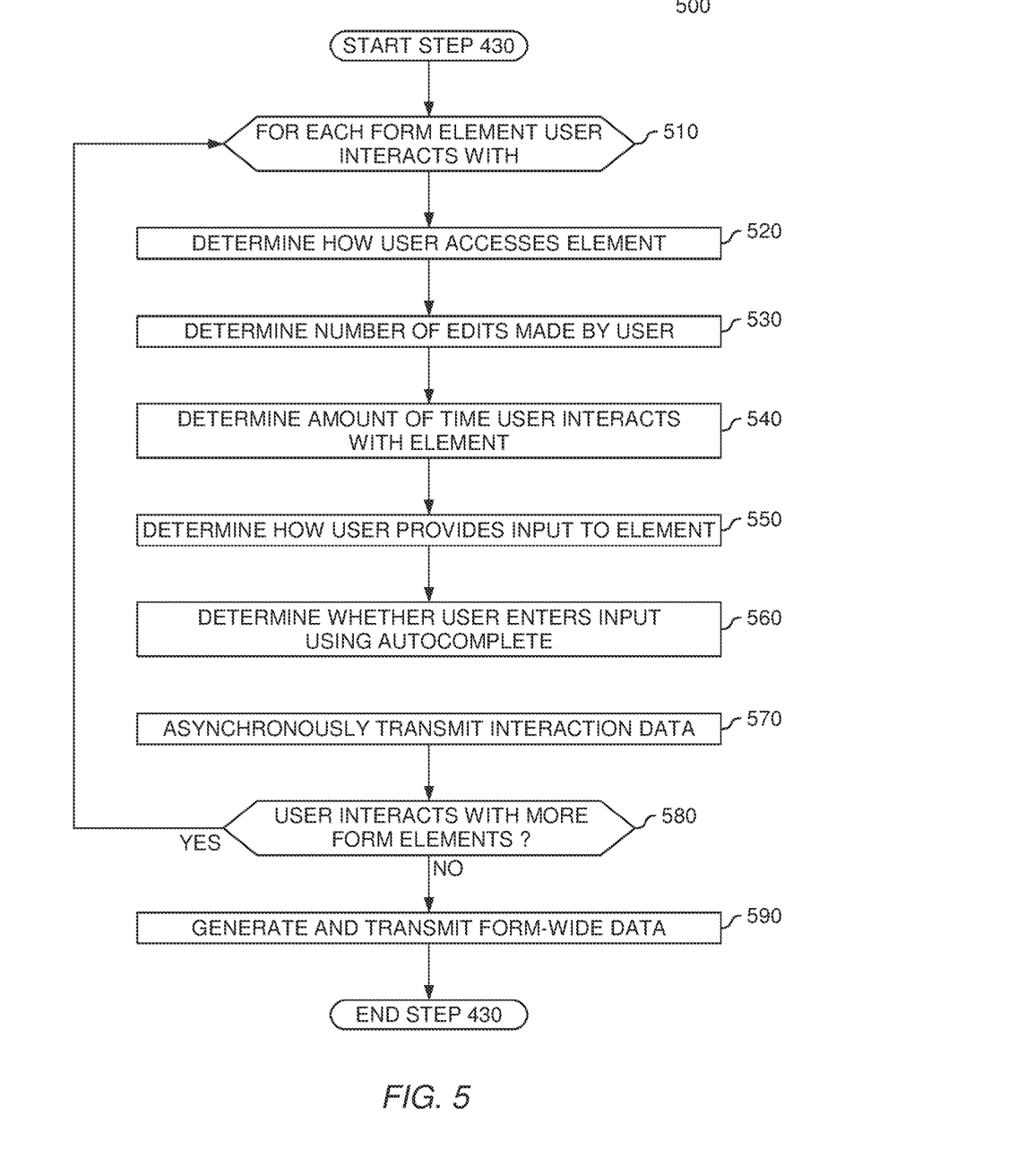
FIG. 5 is a flow chart illustrating a method to monitor user interaction with an analytically enhanced form, according to one embodiment.

FIG. 5 is a flow chart illustrating a method 500 corresponding to step 430 to monitor user interaction with an analytically enhanced form, according to one embodiment. In some embodiments, the enhanced form module 312 performs the steps of the method 500 while a user is interacting with a computerized form. The specific elements of the user's interaction monitored in FIG. 5 should not be considered limiting of the disclosure, as embodiments disclosed herein may monitor any attribute of the user's interaction with the form, and any individual element thereof. At step 510, the enhanced form module 312 executes a loop including steps 520-570 for each form element a user interacts with. At step 520, the enhanced form module 312 may determine how the user accesses the current form element. For example, and without limitation, the user may tab to the form element, or select the element via a touchscreen or a mouse. At step 530, the enhanced form module 312 determines how many entries, edits, or revisions the user made to the input provided in the current form element. For example, a user may enter three different email addresses in an email form. In such a case, the enhanced form module 312 may determine that the user entered the email address three different times.

At step 540, the enhanced form module 312 may compute an amount of time the user interacts with the current element. For example, the user may spend 17 seconds entering a form element requesting a brief listing of hobbies. At step 550, the enhanced form module 312 may determine how the user provides input to the current form element. For example, and without limitation, the user may type via physical keyboard, virtual keyboard, or may select options via a touchscreen, mouse, or other input method. At step 560, the enhanced form module 312 may determine whether the user entered input using autocomplete. The enhanced form module 312 may determine the user used autocomplete based on the amount of time the user spent answering the question. For example, if the user enters an email address in 0.01 seconds, the enhanced form module 312 may determine the user used autocomplete, as the user would be physically unable to type an email address in such a short period of time. Additionally, the enhanced form module 312 may determine that the time the user spent entering the value was less than an autocomplete threshold. Still further, the enhanced form module 312 may determine the user used autocomplete by determining that the user did not use a copy/paste method of input, such as via a mouse click or keyboard combination.

At step 570, the enhanced form module 312 may asynchronously transmit the data gathered at each step 520-560. The enhanced form module 312 may transmit the data as each item of data is gathered (i.e., at each step 520, 530, 540, 550, and 560). At step 570, the enhanced form module 312 determines whether the user is interacting with more form elements. If the user interacts with more form elements, the enhanced form module 312 returns to step 510 to continue monitoring the user's interaction with the analytically enhanced form. If the user is not interacting with more elements (such as when the user clicks a "submit" button), the enhanced form module 312 proceeds to step 580. At step 580, the enhanced form module 312 generates and transmits form-wide data. The form-wide data includes data for the entire form, including, without limitation, the total amount of time the user spent completing the form, a total number of edits made, an amount of idle time, an amount of time the user was not accessing the form (i.e., the form was not the active window on the user's device), and the like.

Figure 6:
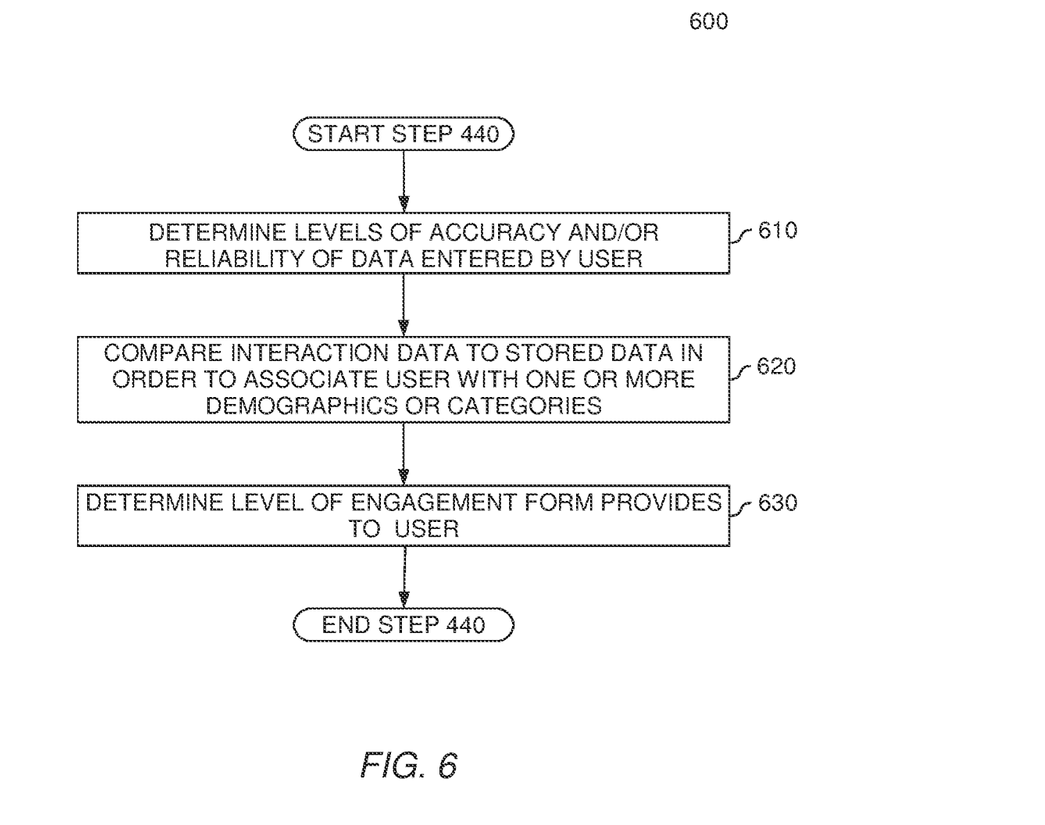
FIG. 6 is a flow chart illustrating a method to process data received by monitoring user interaction with an enhanced form, according to one embodiment.

FIG. 6 is a flow chart illustrating a method 600 corresponding to step 440 to process data received by monitoring user interaction with an enhanced form, according to one embodiment. In some embodiments, the enhanced form module 312 performs the steps of the method 600. Generally, in executing the steps of the method 600, the enhanced form module 312 may analyze the data received by monitoring the user's interactions with an analytically enhanced form.

At step 610, the enhanced form module 312 may determine levels of accuracy and/or reliability of data explicitly entered by a user in the form. For example, rules in the associations data 317 may indicate different tiers of reliability or accuracy based on a number of edits made by the user to one or more form elements. For example, 0-1 edits may indicate high reliability or accuracy, 2-4 may indicate medium reliability or accuracy, and 5 or more edits may indicate low reliability or accuracy. If the user was observed modifying each response in the form more than 5 times, the enhanced form module 312 may determine that the user's data is not reliable or accurate, and assign the user a low level of reliability in his profile data in the profiles 315. At step 620, the enhanced form module 312 may compare the observed interaction data with data stored in the associations 317 in order to associate the user with one or more demographics or categories. For example, if a user repeatedly receives high levels of reliability for the data they entered in the form, the enhanced form module 312 may label the user as being a "trusted user." Similarly, if the user repeatedly speeds through forms (i.e., below a time threshold), the user may be labeled as an unreliable user. At step 630, the enhanced form module 312 may use the received data in order to analyze the form itself. For example, the enhanced form module 312 may determine a level of engagement the form provides to users. If the monitoring data indicates that the users are bored or otherwise unengaged with the form, the enhanced form module 312 may cause subsequent forms to be modified to be more engaging to the user.

Figure 7:
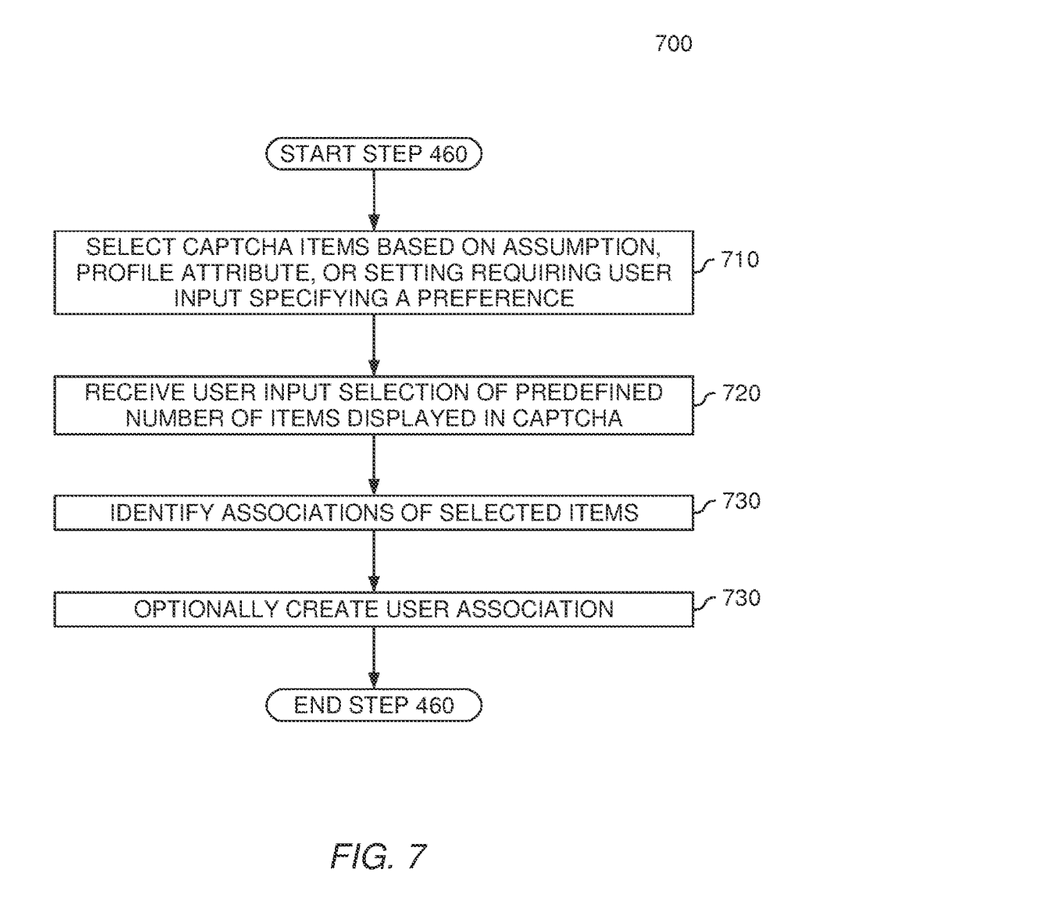
FIG. 7 is a flow chart illustrating a method to process user input provided to a smart CAPTCHA, according to one embodiment.

FIG. 7 is a flow chart illustrating a method 700 corresponding to step 460 to process user input provided to a smart CAPTCHA, according to one embodiment. Generally, the steps of the method 700 provide a smart CAPTCHA that is tailored to gain additional information from the user. In at least one embodiment, the smart CAPTCHA module 313 performs the steps of the method 700. At step 710, the smart CAPTCHA module 313 may select CAPTCHA items for display based on an assumption about the user, a profiling attribute, or a setting requiring user input specifying a preference. Generally, the smart CAPTCHA module 313 select items from the CAPTCHA data 316 based on associations or other data in the associations 317. For example, if the smart CAPTCHA module 313 believes, based on some attribute of the user (such as an IP address, device, operating system, hardware configuration, or the like) is a male, the smart CAPTCHA module 313 may select items from the CAPTCHA data 316 that have predefined associations with males, and additionally select items from the CAPTCHA data 316 that have predefined associations with females. Similarly, if the smart CAPTCHA module 313 wishes to associate (or dissociate) the user with a particular demographic, the smart CAPTCHA module 313 may select items from the CAPTCHA data 316 that are associated with and not associated with the demographic.

The smart CAPTCHA module 313, in selecting items, presents options that are aligned and unaligned with the target attribute, association, demographic, or psychological profile attribute. Doing so presents the user with options that, if selected, would allow the smart CAPTCHA module 313 to either strengthen or weaken an assumption that the user has the target attribute, association, demographic, or psychological profile attribute. Once the smart CAPTCHA module 313 selects the options, the smart CAPTCHA module 313 may generate a CAPTCHA that includes the options, and requests that the user enter a predefined number of the options in the input box. For example, if presented with five shapes as input options, the user may need to type in the names of two of the shapes.

At step 720, the smart CAPTCHA module 313 may receive user input specifying a selection of a predefined number of items displayed in the smart CAPTCHA. At step 730, the smart CAPTCHA module 313 may identify associations in the associations 317 for the input received at step 720. For example, the smart CAPTCHA may display four words, namely "hot," "sand," "cold," and "rocky," from which the user must select two. If the smart CAPTCHA is directed at determining whether the user prefers the beach or the mountains, the smart CAPTCHA module 313 may identify the associations with the selected words. If the user selects "hot" and "sand," the smart CAPTCHA module 313 may reference the associations 317 to determine that these words are identified with the beach. If the smart CAPTCHA is configured to implicitly obtain user preferences, the smart CAPTCHA module 313 may identify a preference associated with the received input. For example, words may be displayed in different sized fonts, with each font size having an association to a respective font size class. At step 740, the smart CAPTCHA module 313 may optionally create an association with the user based on the identified associations. The association may be any type of metadata that may be stored in the profiles 315. For example, the user may be labeled a beach lover. As another example, user may be labeled as being a member of the female gender. As still another example, the user may be identified as having high self esteem (as part of a smart CAPTCHA directed at psychological profiling). If the smart CAPTCHA is directed at obtaining user preferences, the identified user preferences may be stored as part of the user profile 315.

Advantageously, embodiments disclosed herein provide analytically enhanced forms and smart CAPTCHAs. The analytically enhanced forms may monitor user interaction with forms in order to generate data regarding the user and the interactions. This data may be transmitted to a remote server for logging and analysis. The smart CAPTCHAs may be used to implicitly gather information about a user based on the input a user provides to the smart CAPTCHA. By using these techniques, embodiments disclosed herein may implicitly generate data points about users without requiring express user input.

In the foregoing, reference is made to embodiments of the disclosure. However, it should be understood that the disclosure is not limited to specific described embodiments. Instead, any combination of the features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer imple mented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the enhanced form module 312 and/or smart CAPTCHA module 313 could execute on a computing system in the cloud and provide analytically enhanced forms and/or smart CAPTCHAs to users. In such a case, the enhanced form module 312 and/or smart CAPTCHA module 313 could gather data regarding users and store the data in a user profile at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    associating a user with a first value for a first user attribute, of a plurality of user attributes, at a first level of confidence, wherein the first value is selected from at least one of two values for the first user attribute;
    receiving, from the user, selection of a first item of a plurality of items displayed in a first completely automated public Turing test to tell computers and humans apart (CAPTCHA), wherein each of the items is associated with one of the at least two values for the first user attribute;
    associating the user with the first value for the first user attribute at a second level of confidence, different than the first level of confidence, based on an association of the first item displayed in the first CAPTCHA and the first value for the first user attribute, wherein the first and second levels of confidence reflect a respective likelihood that the user is associated with the first value for the first user attribute;
    receiving, from the user, selection of a first item of a plurality of items displayed in a second CAPTCHA, wherein each of the plurality of items displayed in the second CAPTCHA are associated with one of a plurality of possible values for a second user attribute of the plurality of user attributes; and
    associating the user with a first value of the plurality of possible values for the second user attribute based on an association between the first value of the plurality of possible values for the second user attribute and the first item of the plurality of items displayed in the second CAPTCHA.

2. The method of claim 1, further comprising:
    selecting the plurality of items to display in the first CAPTCHA based on a known value for the second user attribute; and
    displaying the selected plurality of items to the user in the first CAPTCHA.

3. The method of claim 2, wherein the second level of confidence is greater than the first level of confidence, wherein the plurality of items are further selected based on a device of the user displaying the first CAPTCHA and an IP address associated with the device of the user, wherein the user is associated with the first value for the first user attribute at the first level of confidence based on the device and the IP address, the method further comprising subsequent to receiving selection of the first item displayed in the first CAPTCHA from the user:
    determining, based on the selection of the first item, that the user is a first user of the device, and not a second user of the device, wherein the device is associated with the first and second users, wherein the first item displayed in the first CAPTCHA is associated with the first user and not the second user.

4. The method of claim 1, wherein the plurality of items displayed in the first CAPTCHA comprise shapes, wherein the first user attribute comprises a psychological profile of the user, wherein each shape is associated with a respective value of a plurality of values for the psychological profile.

5. The method of claim 1, wherein the plurality of items displayed in the first CAPTCHA comprise text, wherein at least two of the plurality of items displayed in the first CAPTCHA are displayed in a different font type, of a plurality of font types, wherein the first user attribute comprises a preferred font type, wherein the first value of the first user attribute comprises a first font type, wherein the first item displayed in the first CAPTCHA is of the first font type, wherein the at least two values for the first user attribute comprise the plurality of font types.

6. The method of claim 5, further comprising:
    storing the first font type of the first item displayed in the first CAPTCHA as the preferred font type of the user; and
    displaying a subsequent content to the user using the preferred font type of the user.

7. The method of claim 1, wherein the plurality of user attributes comprise: (i) a gender, (ii) an age range, (iii) a demographic, and (iv) a preference of the user.

8. A system, comprising:
    a computer processor; and
    a memory containing a program, which when executed by the computer processor, performs an operation comprising:
        associating a user with a first value for a first user attribute, of a plurality of user attributes, at a first level of confidence, wherein the first value is selected from at least one of two values for the first user attribute;
        receiving, from the user, selection of a first item of a plurality of items displayed in a first completely automated public Turing test to tell computers and humans apart (CAPTCHA), wherein each of the items is associated with one of the at least two values for the first user attribute;
        associating the user with the first value for the first user attribute at a second level of confidence, different than the first level of confidence, based on an association of the first item displayed in the first CAPTCHA and the first value for the first user attribute, wherein the first and second levels of confidence reflect a respective likelihood that the user is associated with the first value for the first user attribute;
        receiving, from the user, selection of a first item of a plurality of items displayed in a second CAPTCHA, wherein each of the plurality of items displayed in the second CAPTCHA are associated with one of a plurality of possible values for a second user attribute of the plurality of user attributes; and
        associating the user with a first value of the plurality of possible values for the second user attribute based on an association between the first value of the plurality of possible values for the second user attribute and the first item of the plurality of items displayed in the second CAPTCHA.

9. The system of claim 8, the operation further comprising:
    selecting the plurality of items to display in the first CAPTCHA based on a known value for the second user attribute; and
    displaying the selected plurality of items to the user in the first CAPTCHA.

10. The system of claim 9, wherein the second level of confidence is greater than the first level of confidence, wherein the plurality of items are further selected based on a device of the user displaying the CAPTCHA and an IP address associated with the device of the user, wherein the user is associated with the first value for the first user attribute at the first level of confidence based on the device and the IP address, the operation further comprising subsequent to receiving selection of the first item displayed in the first CAPTCHA from the user:
    determining, based on the selection of the first item, that the user is a first user of the device, and not a second user of the device, wherein the device is associated with the first and second users, wherein the first item displayed in the first CAPTCHA is associated with the first user and not the second user.

11. The system of claim 8, wherein the plurality of items displayed in the first CAPTCHA comprise shapes, wherein the first user attribute comprises a psychological profile of the user, wherein each shape is associated with a respective value of a plurality of values for the psychological profile.

12. The system of claim 8, wherein the plurality of items displayed in the first CAPTCHA comprise text, wherein at least two of the plurality of items displayed in the first CAPTCHA are displayed in a different font type, of a plurality of font types, wherein the first user attribute comprises a preferred font type, wherein the first value of the first user attribute comprises a first font type, wherein the first item displayed in the first CAPTCHA is of the first font type, wherein the at least two values for the first user attribute comprise the plurality of font types.

13. The system of claim 12, the operation further comprising:
   storing the first font type of the first item displayed in the first CAPTCHA as the preferred font type of the user; and
   displaying a subsequent content to the user using the preferred font type of the user.

14. The system of claim 8, wherein the plurality of user attributes comprise: (i) a gender, (ii) an age range, (iii) a demographic, and (iv) a preference of the user.

15. A computer program product, comprising:
   a non-transitory computer readable medium having computer code embodied therewith, the computer code executable by a processor to perform an operation comprising:
      associating a user with a first value for a first user attribute, of a plurality of user attributes, at a first level of confidence, wherein the first value is selected from at least one of two values for the first user attribute;
      receiving, from the user, selection of a first item of a plurality of items displayed in a first completely automated public Turing test to tell computers and humans apart (CAPTCHA), wherein each of the items is associated with one of the at least two values for the first user attribute;
      associating the user with the first value for the first user attribute at a second level of confidence, different than the first level of confidence, based on an association of the first item displayed in the first CAPTCHA and the first value for the first user attribute, wherein the first and second levels of confidence reflect a respective likelihood that the user is associated with the first value for the first user attribute;
      receiving, from the user, selection of a first item of a plurality of items displayed in a second CAPTCHA, wherein each of the plurality of items displayed in the second CAPTCHA are associated with one of a plurality of possible values for a second user attribute of the plurality of user attributes; and
      associating the user with a first value of the plurality of possible values for the second user attribute based on an association between the first value of the plurality of possible values for the second user attribute and the first item of the plurality of items displayed in the second CAPTCHA.

16. The computer program product of claim 15, the operation further comprising:
   selecting the plurality of items to display in the first CAPTCHA based on a known value for the second user attribute; and
   displaying the selected plurality of items to the user in the first CAPTCHA.

17. The computer program product of claim 16, wherein the second level of confidence is greater than the first level of confidence, wherein the plurality of items are further selected based on a device of the user displaying the CAPTCHA and an IP address associated with the device of the user, wherein the user is associated with the first value for the first user attribute at the first level of confidence based on the device and the IP address, the operation further comprising subsequent to receiving selection of the first item displayed in the first CAPTCHA from the user:
   determining, based on the selection of the first item, that the user is a first user of the device, and not a second user of the device, wherein the device is associated with the first and second users, wherein the first item displayed in the first CAPTCHA is associated with the first user and not the second user.

18. The computer program product of claim 15, wherein the plurality of items displayed in the first CAPTCHA comprise shapes, wherein the first user attribute comprises a psychological profile of the user, wherein each shape is associated with a respective value of a plurality of values for the psychological profile.

* * * * *